D. HARGER.

Furnaces.

No. 5,614. Reissued Oct. 21, 1873.

Witnesses

Ewell Dick

Wm. E. Chaffee

Inventor

David Harger by

A. Pollok his atty

AM. PHOTO-LITHOGRAPHIC Co. N.Y. (OSBORNE'S PROCESS)

UNITED STATES PATENT OFFICE.

DAVID HARGER, OF DES MOINES, IOWA.

IMPROVEMENT IN FURNACES.

Specification forming part of Letters Patent No. 70,557, dated November 5, 1867; reissue No. 5,614, dated October 21, 1873; application filed September 30, 1873.

*To all whom it may concern:*

Be it known that I, DAVID HARGER, of Des Moines, in the county of Polk and State of Iowa, have invented a new and useful Improvement in Furnaces; and I do hereby declare the following to be a full, clear, and exact description of the same, reference being had to the accompanying drawings forming part of this specification, and in which—

Figure 1:
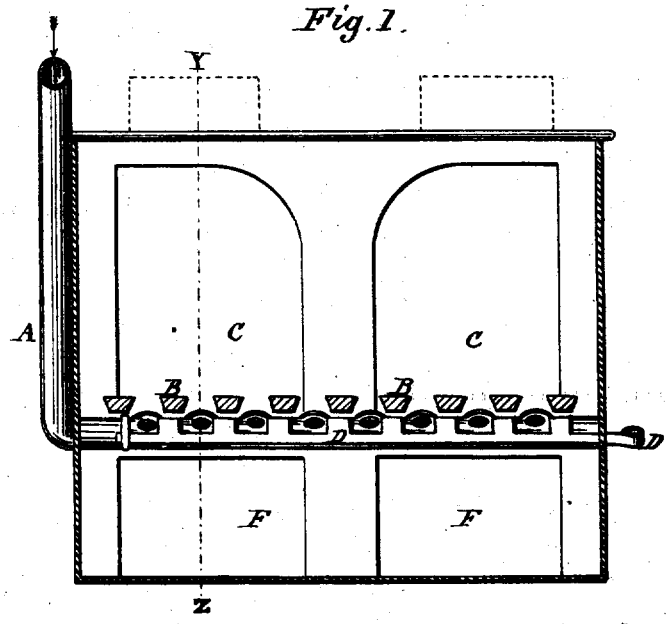
Figure 2:
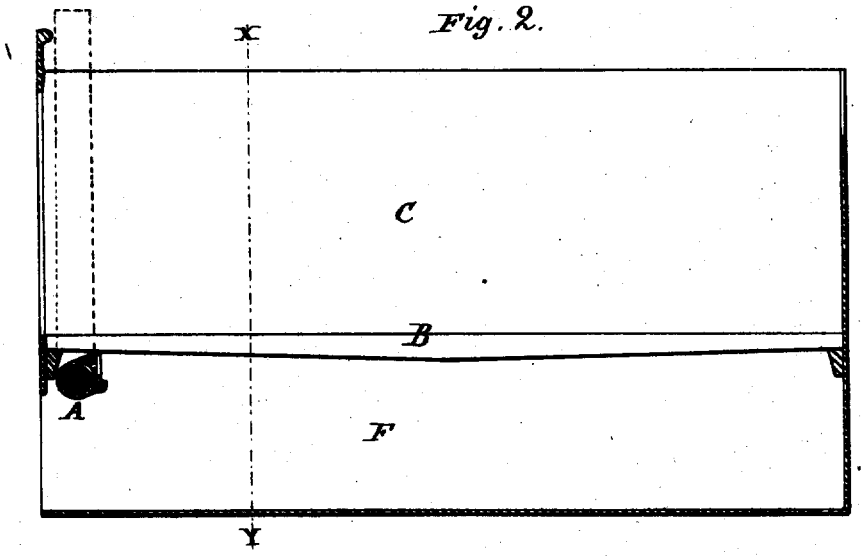

Figure 1 represents a sectional elevation, on line X Y in Fig. 2, of the fire-box or fire-chamber of a furnace to which my improvement is applied; and Fig. 2 is another sectional elevation of the same on line Y Z in Fig. 1.

The object of my invention is to facilitate the combustion of fuel, to increase the intensity of heat thereby generated, and to produce greater useful effect in furnaces with economy in fuel and time. Various means were heretofore employed, in which either or all these objects were sought to be effected, and which, so far as I am informed, more or less failed to accomplish the desired result. Thus, while, in some instances, apparatus was used of costly contrivance, which rendered its use impracticable in places remote from machine-shops provided with full complement of tools and machinery, employing parts difficult to replace or repair, others less expensive and more readily constructed were inefficient or involved the use of steam, the production of which, for the purpose of aiding combustion, was a source of expense which counteracted the beneficial result thereby attained. I have successfully obviated these several shortcomings, and succeeded in devising an economical means, readily and easily constructed, and applicable to any ordinary furnace already built and in use, of powerfully activating the combustion of fuel, producing intense heat, without the use of steam or other vapor artificially produced. To this effect, my invention consists in the employment of a forced blast of air supplied to the furnace through a pipe or duct extending below and crosswise of the grate-bars, and provided with apertures located opposite the openings between the grate-bars, and so as to direct the several jets of air discharged therefrom to pass obliquely up through the spaces between the grate-bars and traverse the fuel, substantially as hereinafter shown and set forth.

In order to enable others to make and use my said invention, I shall now proceed to describe the manner in which the same is or may be carried into effect; and, referring to the drawings—

C is the fire-box or fire-chamber of a furnace, of ordinary or suitable construction, used for generating steam in a boiler, or for other purposes. Grate-bars B are or may be supported in the usual manner upon walls or end irons, and the usual ash-pit F is underneath the grate-bars. A pipe, A, running from a fan or other air-impelling apparatus situated in any part of the building, however remote from the furnace, or even in a neighboring building, is conveyed into the ash-pit toward the front end of, and but a short distance below, the grate-bars, substantially as shown in the accompanying drawings. The portion of the pipe extending under the grate-bars is perforated with a series of holes located along a line, which, with the axis of the pipe, shall determine a plane of about forty-five degrees with the horizontal; or, in other words, a plane which shall traverse obliquely or diagonally the mass of fuel upon the grate when charged. By this arrangement, it will be seen that the air, which may be forced through the pipe, will issue in jets, which pass between the grate-bars, penetrating the fuel, and diffuse through its mass, aided by the draft and the direction given the jets. Too intense heat at, and consequent burning out of, the fire-door is prevented. Moreover, no obnoxious gases will be forced out of the fire-chamber into the furnace-room, as would be the case were the jets projected through the fuel vertically. The pipe may be provided with a slide-valve system, D, both to close the openings when the grate is being cleaned, and thus prevent ashes from dropping into the tube, and to regulate the size of the openings, and thereby regulating the amount of air or intensity of blast.

Having thus described my invention, what I claim is—

The method of facilitating the combustion of fuel in furnaces by means of a forced blast of air supplied to the furnace through a pipe or duct extending below and crosswise of the grate-bars, and provided with apertures, located opposite the openings between the grate-bars, to direct the several jets of air discharged therefrom to pass obliquely up through the spaces between the grate-bars and traverse the fuel, substantially as hereinbefore shown and set forth.

In testimony whereof I have signed my name before two subscribing witnesses.

DAVID HARGER.

Witnesses:
H. C. BARRETT,
T. F. SITTECK.